(12) United States Patent
Capano et al.

(10) Patent No.: US 8,074,911 B2
(45) Date of Patent: Dec. 13, 2011

(54) WIRELESS LIQUID LEVEL SENSING ASSEMBLIES AND GRINDER PUMP ASSEMBLIES EMPLOYING THE SAME

(75) Inventors: David Capano, Greenfield, NY (US);
Clark A. Henry, Scotia, NY (US);
George A. Earle, III, Clifton Park, NY (US); Keith Abatto, Alplaus, NY (US)

(73) Assignee: Environment One Corporation, Niskayuna, NY (US)

( * ) Notice: Subject to any disclaimer, the term of this patent is extended or adjusted under 35 U.S.C. 154(b) by 1155 days.

(21) Appl. No.: 11/748,231

(22) Filed: May 14, 2007

(65) Prior Publication Data
US 2008/0290011 A1    Nov. 27, 2008

(51) Int. Cl.
*B02C 23/36* (2006.01)

(52) U.S. Cl. ............... 241/46.17; 241/101.2; 241/185.6; 73/290 R; 340/618

(58) Field of Classification Search ............... 241/101.2, 241/185.6, 46.017, 46.06; 73/290 R; 340/618
See application file for complete search history.

(56) References Cited

U.S. PATENT DOCUMENTS

| | | | |
|---|---|---|---|
| 3,300,759 A | 1/1967 | Chapman et al. ............. 340/150 |
| 3,362,687 A | 1/1968 | Hensley ......................... 254/187 |
| 3,667,692 A | 6/1972 | Grace ............................. 241/36 |
| 4,025,237 A | 5/1977 | French ........................... 417/131 |
| 4,108,386 A | 8/1978 | Conery et al. ............. 241/46.11 |
| 4,123,792 A | 10/1978 | Gephart et al. ................ 361/30 |
| 4,197,506 A | 4/1980 | Fogelstrom ................... 327/271 |
| 4,201,240 A | 5/1980 | Case ............................. 137/392 |
| 4,223,679 A | 9/1980 | Schulman et al. .............. 607/32 |
| 4,230,578 A | 10/1980 | Culp et al. ....................... 210/86 |
| 4,454,993 A | 6/1984 | Shibata et al. ........... 241/46.017 |
| 4,523,194 A | 6/1985 | Hyde .......................... 340/853.3 |
| 4,561,443 A | 12/1985 | Hogrefe et al. .................. 607/31 |
| 5,235,326 A | 8/1993 | Beigel et al. ............... 340/10.41 |
| 5,439,180 A | 8/1995 | Baughman et al. ............. 241/36 |
| 5,553,794 A | 9/1996 | Oliver et al. .................... 241/36 |
| 5,559,507 A | 9/1996 | Beigel ........................ 340/10.34 |
| 5,562,254 A | 10/1996 | Sleasman et al. .......... 241/46.01 |
| 5,577,890 A | 11/1996 | Nielsen et al. ................ 417/44.2 |
| 5,672,050 A | 9/1997 | Webber et al. .................. 417/18 |
| 5,712,630 A | 1/1998 | Nanboku et al. ............. 340/10.3 |
| 5,752,315 A | 5/1998 | Sleasman et al. ............... 29/888 |

(Continued)

OTHER PUBLICATIONS

Henry et al., pending U.S. Appl. No. 29/280,014, filed May 14, 2007 entitled "Grinder Pump Assembly".

(Continued)

*Primary Examiner* — Mark Rosenbaum
(74) *Attorney, Agent, or Firm* — Heslin Rothenberg Farley & Mesiti P.C.

(57) ABSTRACT

A liquid level sensing assembly employs an inductive or magnetic coupling to wirelessly communicate a plurality of signals based on a changing level of wastewater in a tank to a first coil of a pump/alarm control circuit in the grinder pump. The assembly includes at least one liquid level sensor operable in response to the changing level of the wastewater, a second coil positionable adjacent to the first coil in the grinder pump, and a transponder for extracting electrical energy using the second coil in response to the first coil. The transponder is operably connected to the at least one liquid level sensor and operable to wirelessly transmit from the second coil to the first coil the plurality of signals based on the state of the at least one liquid level sensor due to the changing level of the wastewater in the tank.

44 Claims, 10 Drawing Sheets

U.S. PATENT DOCUMENTS

| | | | |
|---|---|---|---|
| 5,771,178 A | 6/1998 | Stemporzewski, Jr. et al. | 702/45 |
| D397,763 S | 9/1998 | Sabo | D23/203 |
| 5,816,510 A | 10/1998 | Earle et al. | 241/46.01 |
| 5,863,194 A | 1/1999 | Kadah et al. | 431/24 |
| 5,954,089 A | 9/1999 | Seymour | 137/487.5 |
| 5,966,311 A | 10/1999 | Stemporzewski, Jr. et al. | 700/281 |
| 6,046,680 A | 4/2000 | Soenen et al. | 340/5.23 |
| 6,059,208 A | 5/2000 | Struthers | 241/46.01 |
| 6,203,282 B1 | 3/2001 | Morin | 417/44.1 |
| 6,546,795 B1 * | 4/2003 | Dietz | 73/290 R |
| 6,632,072 B2 | 10/2003 | Lipscomb et al. | 417/36 |
| 6,806,808 B1 | 10/2004 | Watters et al. | 340/10.41 |
| 6,969,287 B1 | 11/2005 | Motsenbocker | 440/1 |
| D556,293 S | 11/2007 | Daley et al. | D23/203 |
| 2003/0025612 A1 | 2/2003 | Holmes et al. | 340/870.02 |
| 2003/0236592 A1 | 12/2003 | Shajii et al. | 700/282 |
| 2005/0033479 A1 | 2/2005 | Parker | 700/282 |
| 2005/0052282 A1 | 3/2005 | Rodgers et al. | 340/572.1 |
| 2005/0092838 A1 | 5/2005 | Tsirline et al. | 235/449 |
| 2005/0136301 A1 | 6/2005 | Knaggs et al. | 429/22 |
| 2005/0174255 A1 | 8/2005 | Horler | 340/870.01 |
| 2006/0060685 A1 | 3/2006 | Kowalak et al. | 241/46.017 |
| 2006/0103535 A1 | 5/2006 | Pahlaven et al. | 340/572.1 |
| 2006/0260993 A1 | 11/2006 | Daley et al. | 210/173 |

OTHER PUBLICATIONS

Capano et al., pending U.S. Appl. No. 12/152,403, filed May 14, 2008 entitled "Pump Assemblies Having a Quick-Release Latching Mechanism and Methods for Securing Pump Assembly in a Tank".

Capano et al., pending PCT patent application, Application No. PCT/US08/06134 filed May 14, 2008, entitled "Wattmeter Circuit for Operating a Grinder Pump Assembly to Inhibit Operating Under Run Dry or Blocked Conditions".

Analog Devices Data Sheet, "Energy Metering IC with Integrated Oscillator and Reverse Polarity Indication", Revision A, 20 pages, 2006.

\* cited by examiner

WIRELESS LIQUID LEVEL SENSING ASSEMBLIES AND GRINDER PUMP ASSEMBLIES EMPLOYING THE SAME

CROSS-REFERENCE TO RELATED APPLICATION

This application contains subject matter which is related to commonly owned and concurrently filed U.S. Design patent application Ser. No. 29/280,014, entitled "Grinder Pump Assembly," by Henry et al., which issued as U.S. Pat. No. D594,491, and commonly owned and concurrently filed U.S. Provisional Patent Application Ser. No. 60/917,844, entitled "Grinder Pumps And Components Therefor" by Werner et al. The entire subject matter of these applications being incorporated herein by reference.

FIELD OF THE INVENTION

The present invention relates generally to liquid level sensors, and more particularly to wireless liquid level sensing assemblies and grinder pump assemblies employing the same.

BACKGROUND OF THE INVENTION

Grinder pumps are often used in low-pressure wastewater systems for pumping wastewater. The grinder pumps include a grinder mechanism for cutting or grinding solids or semi-solid matter in the wastewater being pumped. Grinding solids and/or semisolid matter in the wastewater allows the resulting particulate effluent to be transferred through small diameter pipes without clogging.

Conventional grinder pump systems are typically equipped with level sensors and an alarm. When the wastewater reaches a certain level in the tank, the pump automatically switches on and when the wastewater in the tank falls below a certain level, the pump automatically turns off. If the level rises too high, typically another sensor activates an alarm. Conventional level sensors include mechanical float switches, sensing tubes connected to pressure transducers, ultrasonic transducers, and capacitive level sensors. Wires connect the sensors to a circuit for controlling the grinder pump and an alarm. Where a low-level sensor fails, the grinder pump may be operated in response to a high-level alarm so that the grinder pump cycles on and off and maintains the level of the wastewater near the high level position.

There is a need for further liquid level sensing assemblies for grinder pump assemblies.

SUMMARY OF THE INVENTION

In a first aspect, the present invention provides a liquid level sensing assembly for wirelessly transmitting a plurality of signals based on a changing level of wastewater in a tank to a first coil of a transceiver/controller of a grinder pump. The liquid level sensing assembly includes at least one liquid level sensor operable in response to the changing level of the wastewater in the tank, a second coil positionable adjacent to the first coil of the transceiver/controller of the grinder pump, and a transponder for extracting electrical energy using the second coil in response to the first coil. The transponder is operably connected to the at least one liquid level sensor and operable to wirelessly transmit from the second coil to the first coil the plurality of signals based on the state of the at least one liquid level sensor due to the changing level of the wastewater in the tank.

In a second aspect, the present invention provides a liquid level sensing assembly for wirelessly transmitting a plurality of signals based on a changing level of wastewater in a tank to a control unit having a first coil disposed in a grinder pump. The liquid level sensing assembly includes a sealed housing, and a first and a second air columns, the upper ends of which are operably connected to the sealable housing and lower ends of which are positionable in the wastewater. A first pressure sensor is operably connected to the sealed housing and responsive to pressure in the first air column for determining a low wastewater level, and a second pressure sensor operably connected to the sealed housing and responsive to pressure in the second air column for determining an alarm wastewater level. A second coil is positionable adjacent to the first coil of the transceiver/controller of the grinder pump. A transponder is disposed in the sealed housing for extracting electrical energy from the second coil in response to the first coil. The transponder is operably connected to the first and second pressure sensors and operable to wirelessly transmit from the second coil to the first coil the plurality of signals based on a combination of the states of the first pressure sensor and the second pressure sensor due to the changing level of the wastewater in the tank.

In a third aspect, the present invention provides a grinder pump assembly which includes the liquid level sensing assemblies described above and a grinder pump.

In a fourth aspect, the present invention provides a method for controlling the operation of a grinder pump in a tank in which wastewater is received. The method includes detecting a changing level of the wastewater in the tank, wirelessly transmitting to the grinder pump a plurality of signals based on the changing level of the wastewater in the tank, monitoring the wirelessly transmitted plurality of signals in the grinder pump, and operating the grinder pump in response to the detected wirelessly transmitted plurality of signals.

In a fifth aspect, the present invention provides a grinder pump system for use in a tank. The grinder pump system includes a grinder pump and a generally inverted U-shaped liquid level sensing assembly comprising a central portion having a sealed housing and first and second downwardly-depending air columns. The liquid level sensing assembly is positionable generally over said grinder pump.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and the accompanying drawings in which:

DETAILED DESCRIPTION OF THE INVENTION

One aspect the present invention is directed to grinder pump systems and stations employing inductive or magnetic coupling to wirelessly communicate a varying state of physically remote and ohmically isolated liquid level sensors such as pressure switches, or other switches or sensors (via a transponder) enclosed in a liquid level sensing assembly to a pump/alarm control circuit (via a transceiver/controller) enclosed within grinder pump housing. By providing the transponder and liquid level sensor, and the pump/alarm control circuit, in separate enclosures or cavities, the potential for leaks is minimized and use of low-voltage sensors may reduce the risk of explosion. Another aspect of the present invention is directed to a matingly engaging liquid level sensing assembly and grinder pump.

Figure 1:
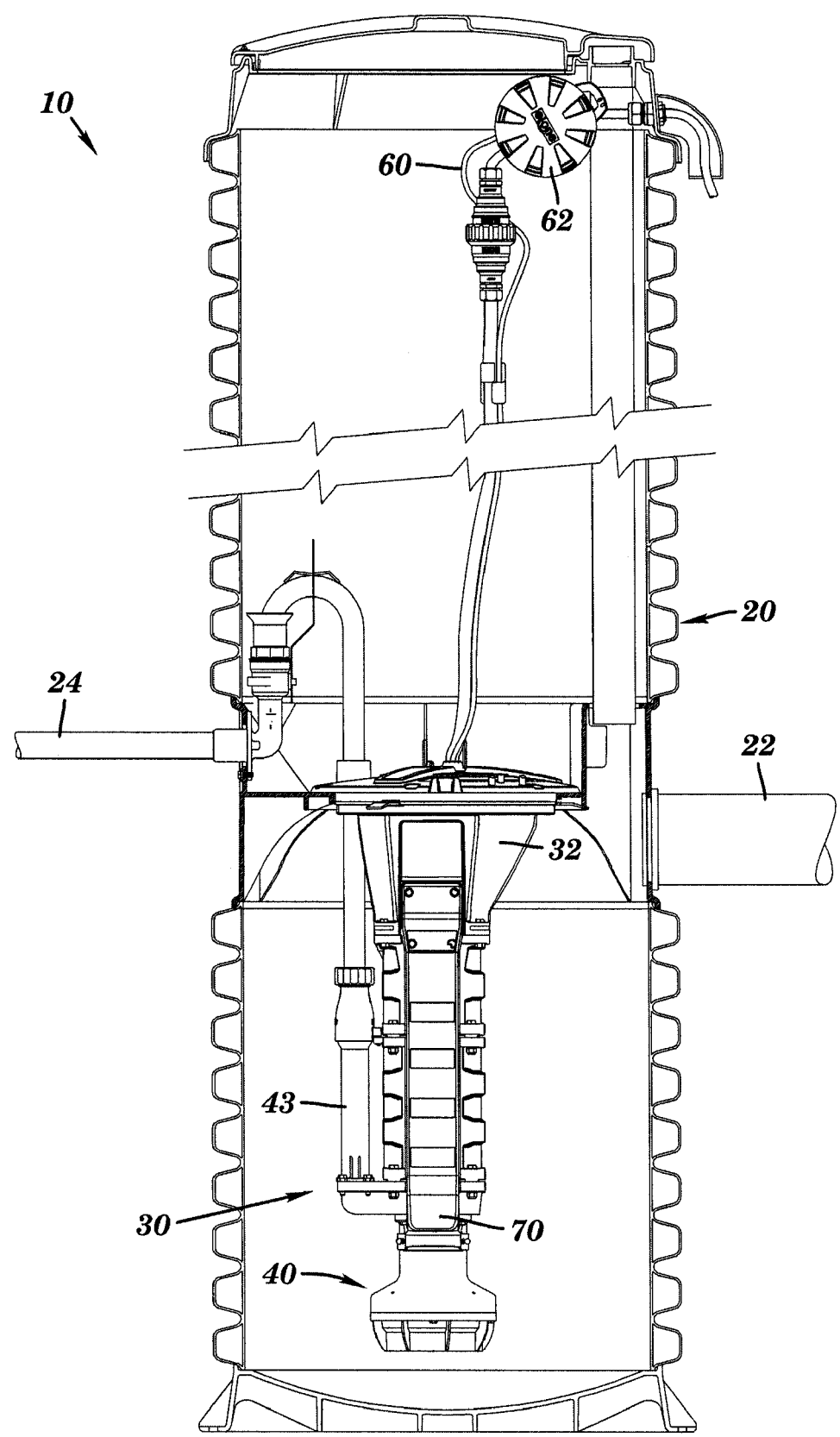
FIG. 1 is an elevational view, partially cutaway, of one embodiment of a grinder pump station in accordance with the present invention in which a grinder pump assembly is disposed in a tank.

Initially, FIG. 1 illustrates one embodiment of a low-pressure grinder pump station 10 in accordance with the present invention for collecting, grinding, and pumping wastewater. Grinder pump station 10 generally includes a tank 20 and a grinder pump assembly 30. Grinder pump station 10 is installable in the ground by connecting the station to a wastewater feed pipe 22, a wastewater discharge pipe 24, and an electrical power supply via an electrical cable (not shown). The system may also be connected to or include a vent.

Figure 2:
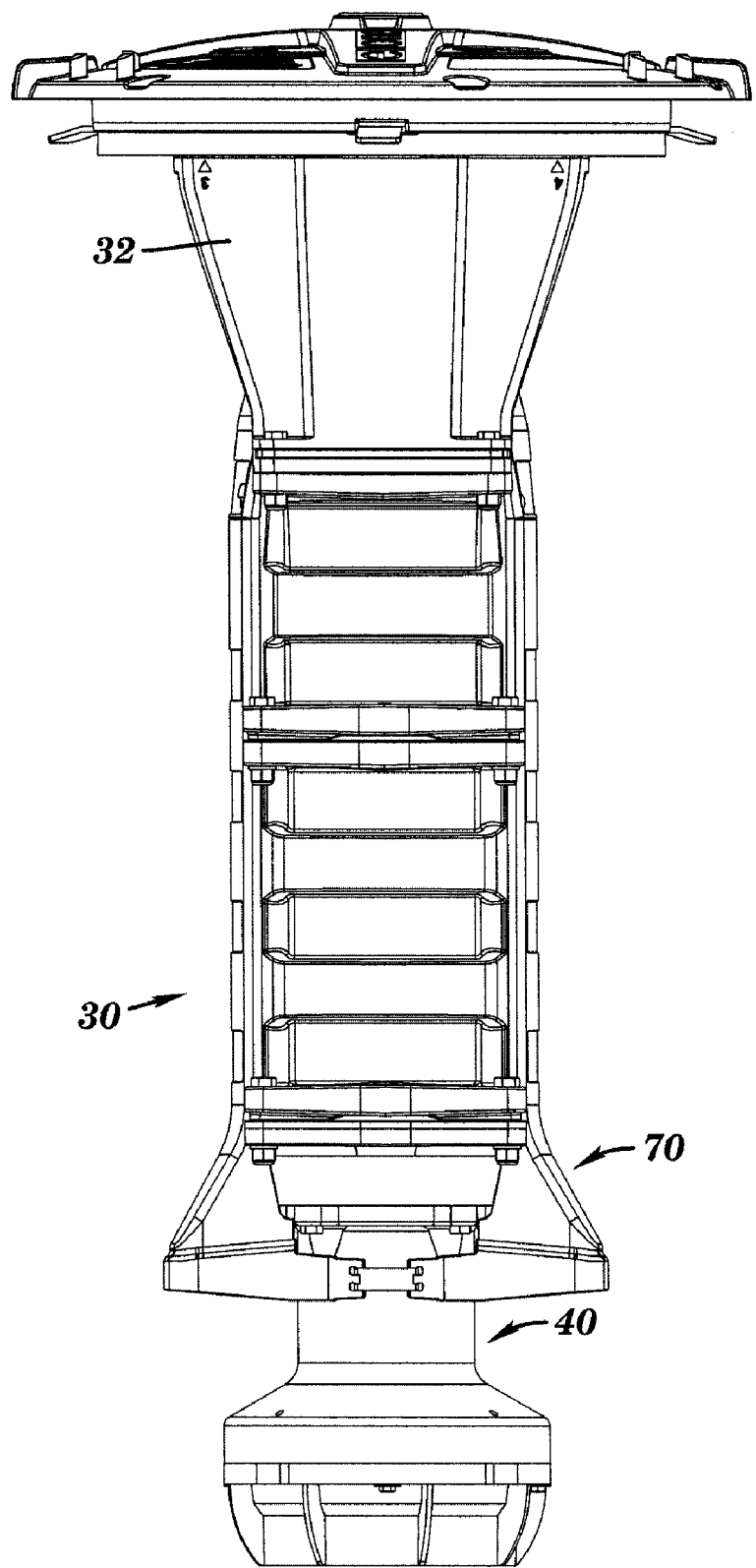
FIG. 2 is a right side elevational view of the grinder pump assembly of FIG. 1.
Figure 3:
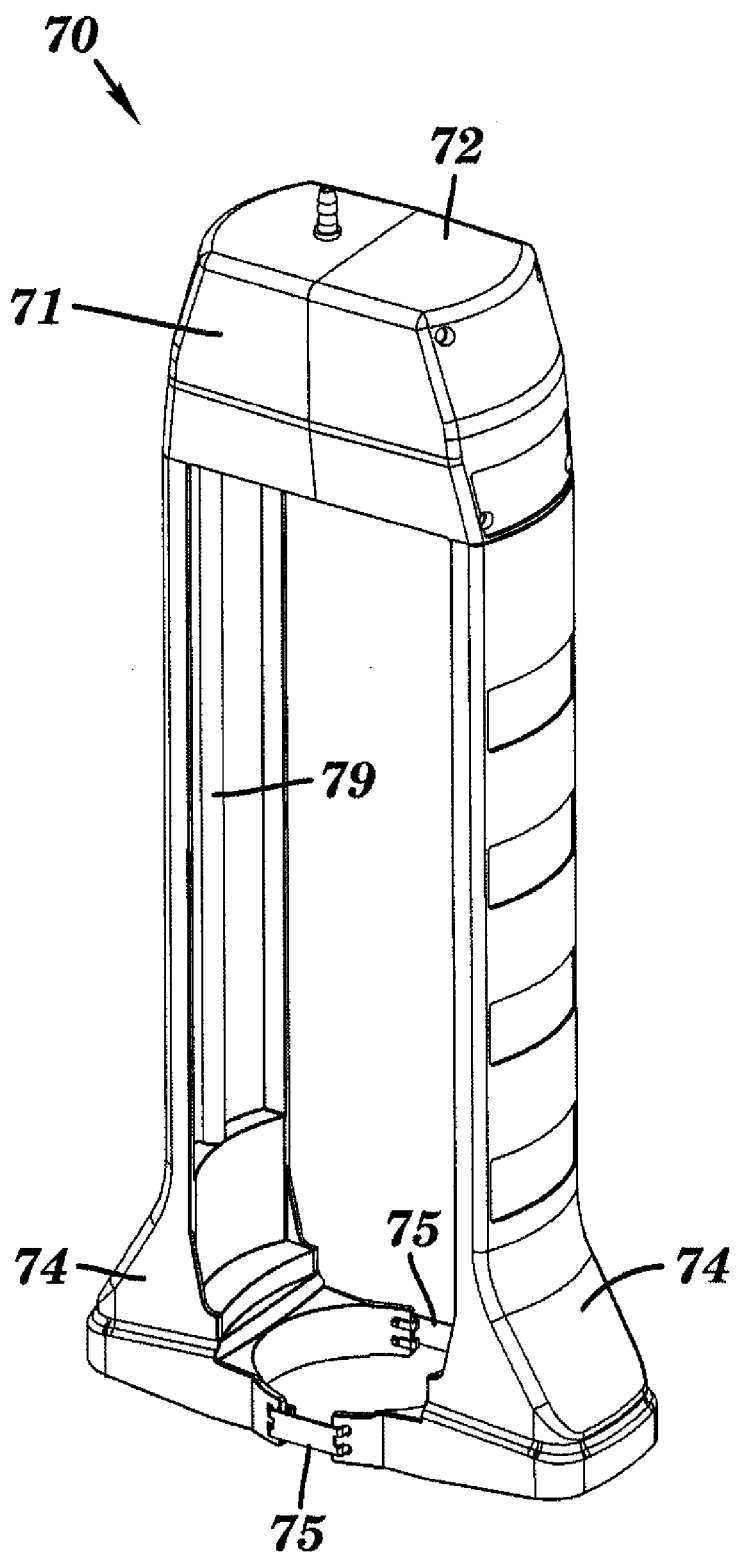
FIG. 3 is a perspective view of the liquid level sensing assembly of the grinder pump assembly of FIG. 1.

As shown in FIGS. 1 and 2, grinder pump assembly 30 generally includes a grinder pump 40 and a liquid level sensing assembly 70. A top housing 32 supports grinder pump assembly 30 in tank 20 (FIG. 1). As best shown in FIG. 3, liquid level sensing assembly 70 has a generally inverted U-shaped housing 71 having a central portion 72 and a plurality of downwardly-depending air columns 74 which may flare out to define a bell at the lower end thereof. The liquid level sensing assembly may be connected via a tube 60 (FIG. 1) to an equalizer 62 (FIG. 1) having a thin diaphragm. A benefit of the smaller sized sealed chamber in the liquid level sensing housing (as explained below) allows for a smaller equalizer. Such a watertight system of the liquid level sensing housing and equalizer allows for compensation for atmospheric pressure fluctuations in the sensing of the pressure due to the level of the wastewater.

Figure 5:
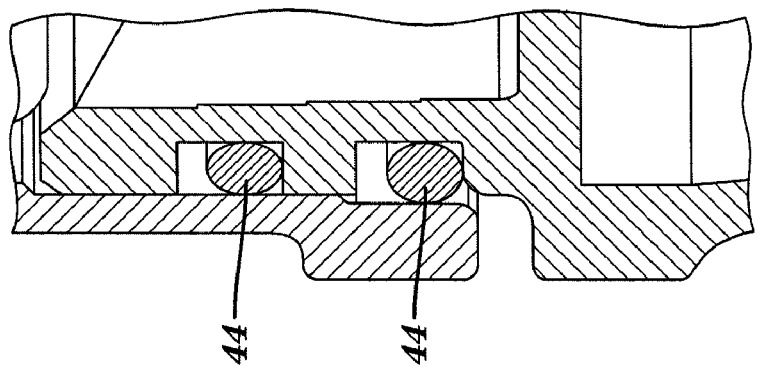
FIG. 5 is a cross-sectional view of detail 5 shown in FIG. 4.
Figure 4:
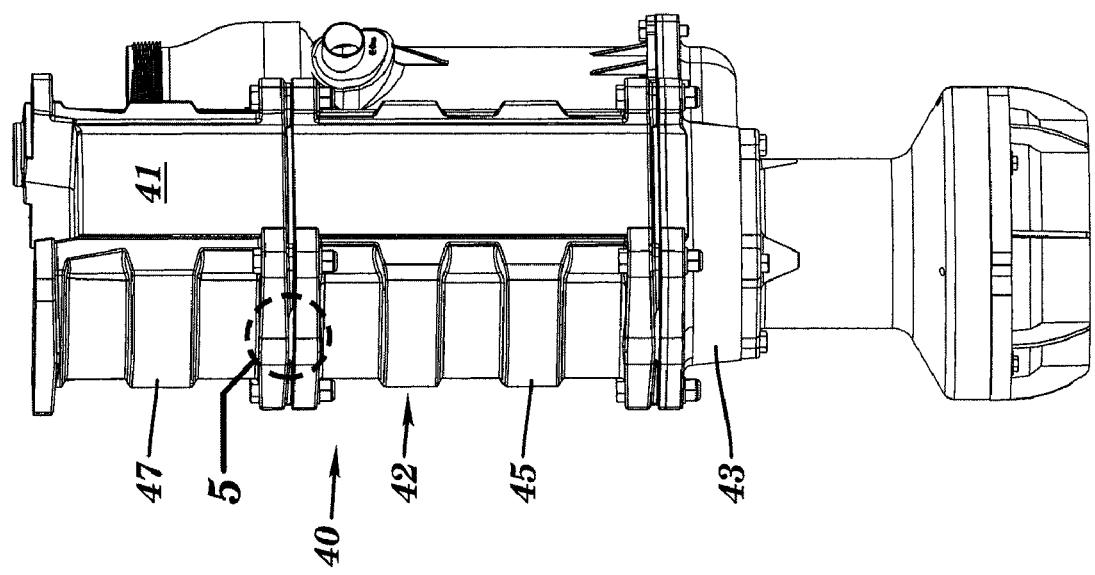
FIG. 4 is a partially rotated, side elevational view of the grinder pump of FIG. 1.

The downwardly-depending air columns may be received in recessed channels 41 (only one of which is shown in FIG. 4) formed in a grinder pump housing 42 in grinder pump 40. Recessing the air columns in the channels helps to protect the air columns, and particularly portions of the sides of the air columns due to the housing castings. Connecting straps 75 secure the ends of the air columns to each other and to the grinder pump housing. As shown in FIGS. 1 and 2, together the grinder pump and the liquid level sensing housing form a generally smoothly configured outer surface. In addition, as shown in FIG. 4, grinder pump housing 42 may be a casting and may be formed from a plurality of section 43, 45, and 47 which are connected via bolts with radial seals or O-rings 44, as best shown in FIG. 5.

For example, an overlapping cylindrical joint may be formed between the casting sections with a lower casting section providing an inner cylinder surface and an upper casting section providing an outer cylinder surface. The joint may have two O-ring grooves machined in the lower/inner casting section. Each casting section may also have a corresponding flange having apertures for receiving bolts to hold the two flanges together after assembly. The flanges may include a gap between them when properly assembled as well as the inner and outer cylinders up to the point where the lower O-ring is located. This gap maybe made intentionally large to minimize the likelihood of crevice corrosion created by trapping moisture between metal surfaces in intimate contact. These surfaces (exterior, flanges and the interior surfaces up to and including the lower O-ring groove) may be coated with a corrosion resistant paint. The surfaces above the lower O-ring groove may be machined to provide a suitable surface conditions for sealing the upper O-ring. In between the two O-rings, a water repellent grease, such as silicone, maybe applied as an additional corrosion barrier to stop any wastewater that might get past the lower O-ring.

Figure 6:
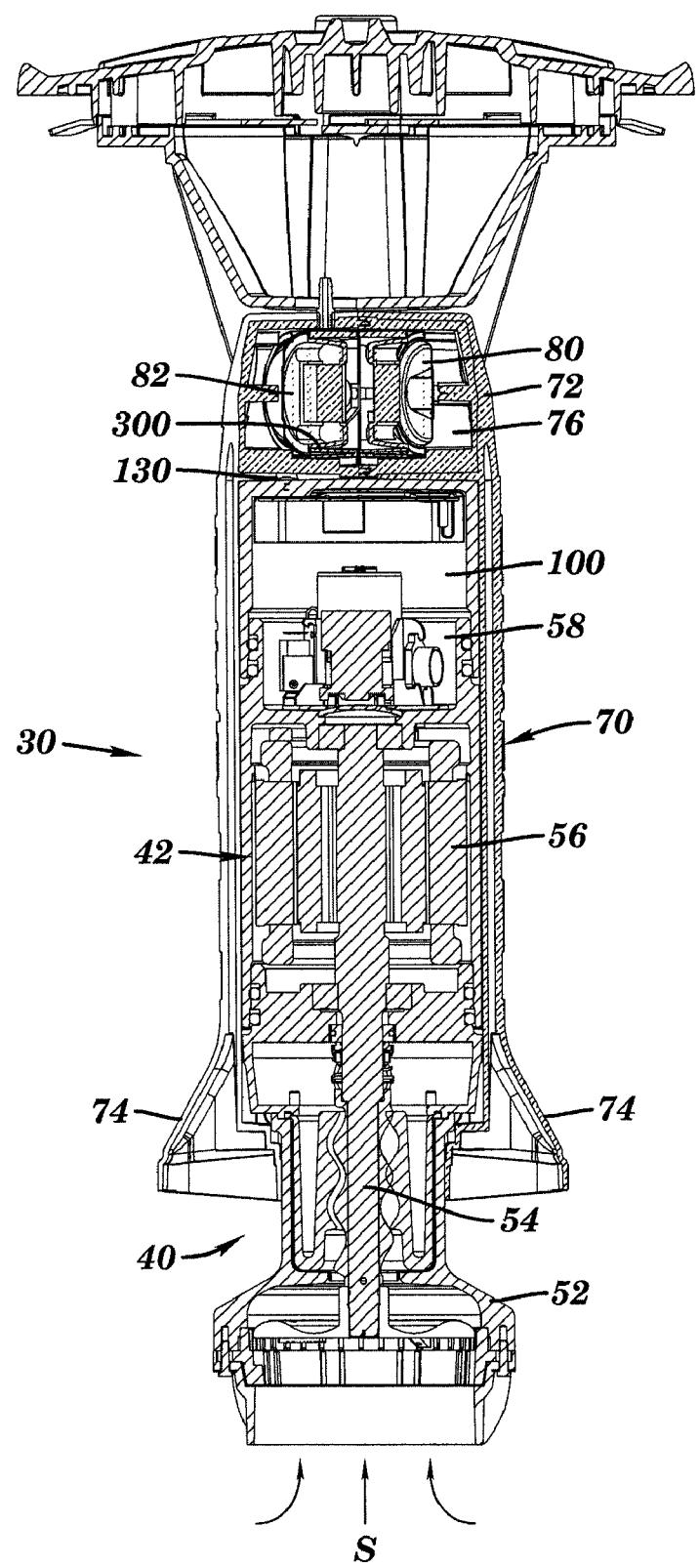
FIG. 6 is an enlarged cross-sectional view of the grinder pump assembly of FIG. 1.

With reference to FIG. 6, grinder pump 40 generally includes housing 42, a grinder mechanism 52, a pump assembly 54, an electric motor 56, motor controls 58, and a controller/transceiver 100. Liquid level sensing assembly 70 includes central portion 72 which defines a cavity 76 such as a sealed chamber in which is contained a transponder 300, and switches 80 and 82 such as pressure switches as described below.

Grinder mechanism 52 pulverizes solids or semisolid matter in the wastewater. Pump assembly 54 is attached to grinder mechanism 52 for pumping the ground wastewater through grinder pump 40. Electric motor 56 powers both grinder mechanism 52 and pump assembly 54. For example, a grinder mechanism may include a stationary outer ring and a rotating cutting blade, and a pump assembly may include a progressing cavity pump having a pump housing, a pump stator, and a pump rotor. In operation, wastewater is drawn into grinder mechanism 52, as illustrated by the curved arrows S in FIG. 6, for cutting or grinding of the solids or semisolid matter in the wastewater. The resulting processed particulate effluent passes through grinder pump 40, a pipe 43 (FIG. 1), and then through wastewater discharge pipe 24 (FIG. 1) to a remote location, e.g., to a pressure wastewater main and ultimately to a wastewater treatment plant.

As described above, grinder pump assembly 30 of the present invention employs an inductive or magnetic coupling to wirelessly communicate the varying or changing level of the wastewater in the tank to the pump/alarm control circuit. For example, the varying or changing state of physically remote and ohmically isolated liquid level sensors such as pressure switches, or other switches or sensors (transponder) enclosed in a level sensing housing may be transmitted to a pump/alarm control circuit (transceiver/controller) enclosed within grinder pump housing.

Figure 7:
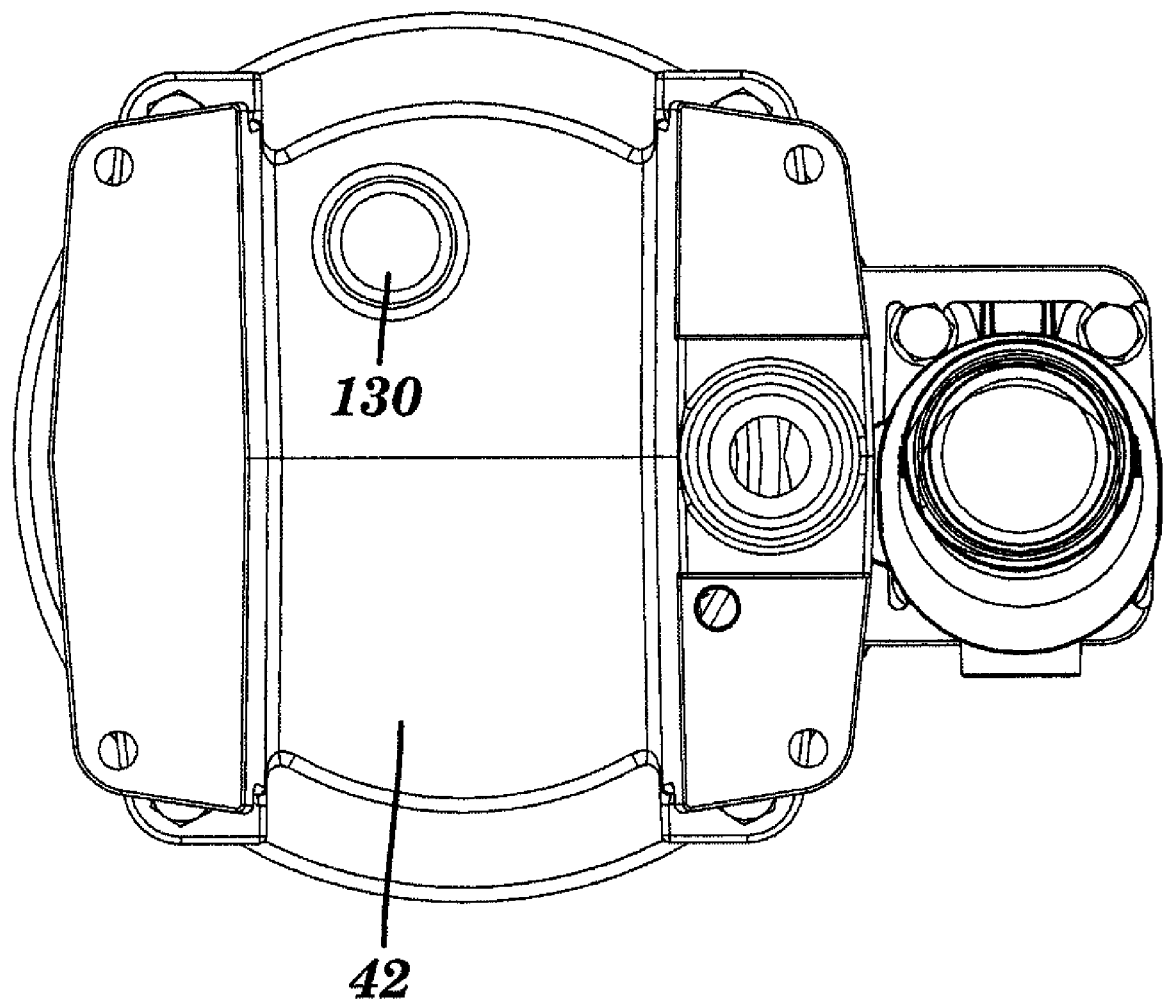
FIG. 7 is a top view of the grinder pump of FIG. 1 illustrating the coil of the transceiver/controller.
Figure 8:
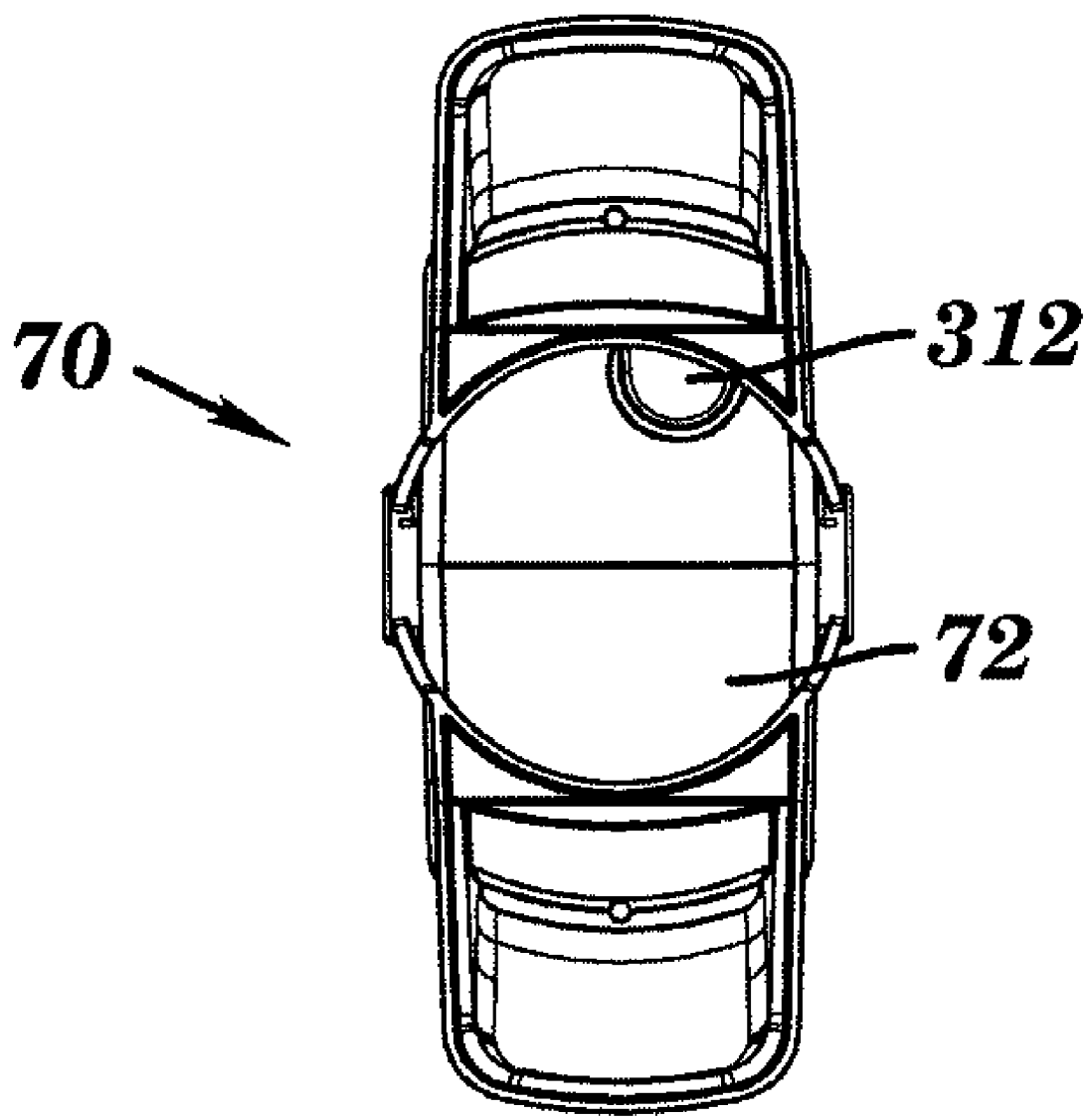
FIG. 8 is a bottom view of the liquid level sensing assembly of FIG. 1 illustrating the coil of the transponder.

As shown in FIGS. 7 and 8, disposed on the top of grinder pump housing 42 (FIG. 7) is a first coil 130 (FIG. 7) of the transceiver/controller, and disposed on the bottom of the central portion 72 of liquid level sensing assembly 70 (FIG. 8) is a second coil 312 (FIG. 8). When the liquid level sensing assembly is received in the recessed channels of the grinder pump housing the coils are spaced-apart from each other. The coils may be coaxially aligned, i.e., the two coils may have a common axis or coincident axes. First coil 130 is disposed outside the housing of the grinder pump so as to not be magnetically coupled to the grinder pump housing.

Figure 9:
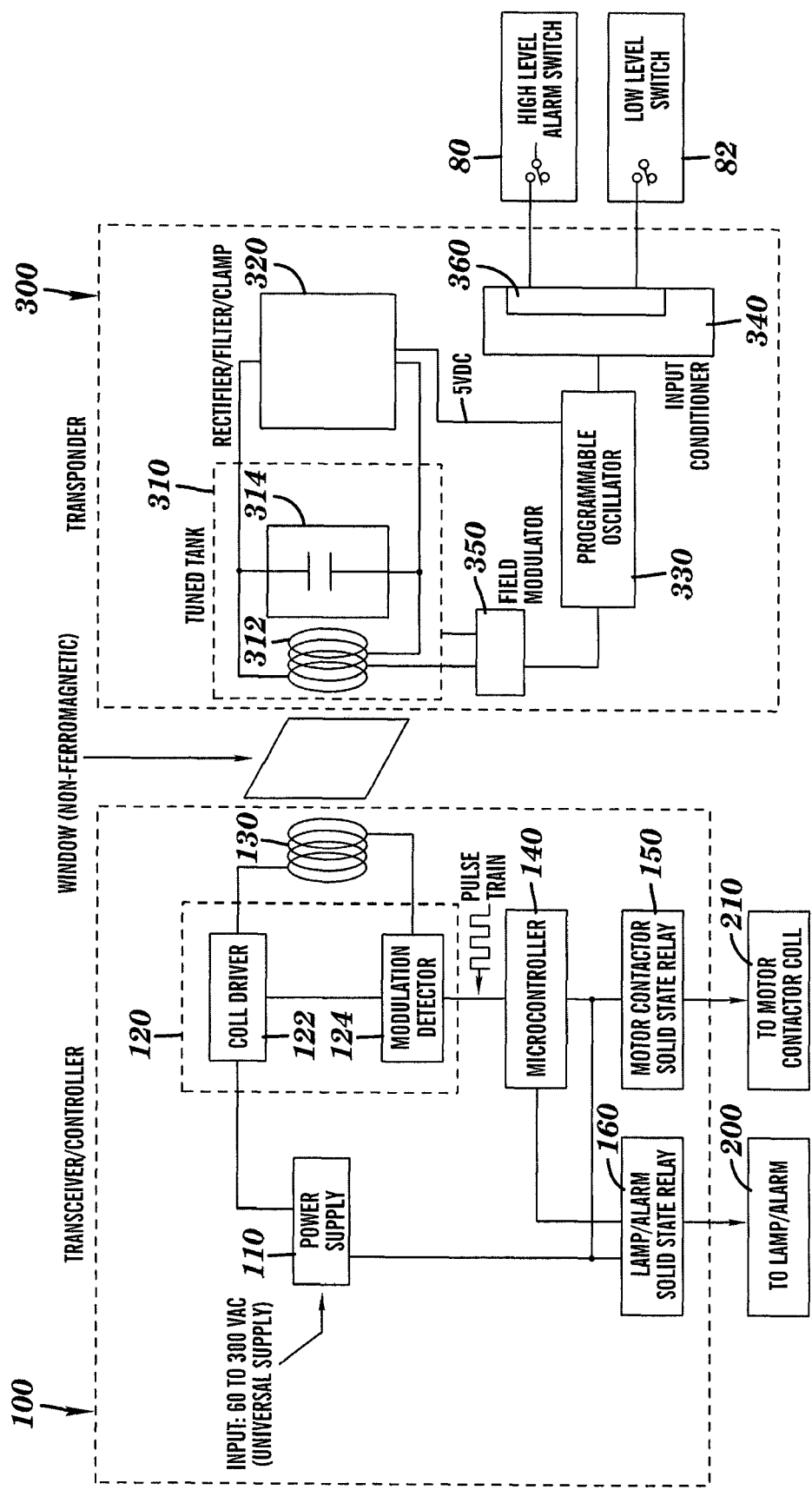
FIG. 9 is a circuit diagram of one embodiment of the inductive or magnetic coupling for the wireless transfer of data between the liquid level sensing assembly and the grinder pump of FIG. 1.

FIG. 9 illustrates a circuit diagram of transceiver/controller 100 which is wirelessly coupled via principally a magnetic field (the electrical component being minimized) across a gap to transponder 300.

Transceiver/controller 100 may be operably coupled to a lamp/alarm 200 and a motor contactor coil 210. Transponder 300 may be operably coupled to high-level alarm switch 80 and low-level/on-off switch 82. As described in greater detail below, the transponder transmits to the transceiver/controller, not a single fixed data set or signal, but varying data or signals over time which define a changing or varying state of the level of the wastewater in tank 20 (FIG. 1).

Generally, transceiver/controller 100, in addition to generating a magnetic field for powering transponder 300, provides circuitry which can detect the field fluctuations from the transponder so as to retrieve a characteristic frequency from the transponder, and therefore, determine the state of the various sensors 80 and 82. Transponder 300 receives and extracts energy from an alternating magnetic field produced by transceiver/controller 100. In turn, this energy powers circuitry which (a) encodes each of all of the possible states of the sensors into a characteristic frequency and, (b) electrically loads and unloads the magnetic field at the characteristic frequency to produce field fluctuations which are detected by the transceiver/controller. In effect, a technique of modulation is employed to encode the state of the sensor.

Transceiver/controller 100 generally receives power via a power supply 110 such as an A/C main and includes a reader chip 120, a microcontroller 140, a motor contactor solid state relay 150, and a lamp/alarm solid state relay 160. Reader chip 120 includes a coil driver 122 which produces a compliant, oscillatory current at (nominally) 125 kHz in coil 130 and a modulation detector 124. A suitable reader chip may be a CMOS (complementary metal-oxide-semiconductor) integrated transceiver circuit intended for use in a RFID (radio-frequency identification) base station.

Transponder 300 generally includes a tuned tank 310, a rectifier/filter/clamp 320, a programmable oscillator 330, and input conditioner 340, and a field modulator 350.

In the transceiver/controller, the oscillatory current generated by coil driver 122 creates a magnetic field around coil 130 which alternates (i.e., changes polarity) at 125 kHz. Due to the smaller relative size of coil 130 with respect to the wavelength of this frequency, the generated field does not detach and propagate from coil 130 as an electromagnetic wave. Instead, this field (called the "near" field) remains local and permits a "weak" magnetic coupling to be established to the receiving circuit which is sensitive to the field.

The transponder is made to couple to the field by means of tuned tank 310 which includes coil 312 and one, or more, capacitors 314. The values of the components within the tuned tank are chosen to establish a condition of circuit parallel resonance which permits the tuned tank to extract a small amount of energy from the magnetic field. This energy appears as a 125 kHz alternating current and voltage which is rectified, filtered, and clamped to 5 VDC by rectifier/filter/clamp 320 using suitable components, e.g., diodes, capacitors, and Zener diodes.

Once the presence of 5 VDC is established, programmable oscillator 330 becomes active. A suitable programmable oscillator is available and found in one of the components available in the family of CMOS integrated circuits. For example, the programmable oscillator may be comprised of a stable, square wave, free running oscillator. The free running frequency is chosen which is substantially different, e.g., much lower than the 125 kHz carrier frequency of transceiver/controller 100. For example, the free running oscillator may initially run at frequency F of about 2,400 Hz.

The programmable oscillator has an input side for selecting the frequency of oscillation. An input conditioner 340 having a selector stage 360 is connected to high-level alarm switch 80 and low-level/on-off switch 82. Selector stage 360 selects a given frequency that is transmitted by the programmable oscillator 330 based on the inputs from the high-level alarm switch 80 and low-level/on-off switch 82.

The free running oscillator feeds a multi-stage binary ripple counter. The counter contains a chain of divide-by-two flip-flops with the output of each flip-flop stage feeding the input of the next. In this manner each sequential stage outputs a pulse train at a frequency which is half that of its input frequency. Provision is made in the programmable oscillator to select the frequency of a specific stage by a multi-bit digital input code.

In operation, mechanical switches within the level sensors annunciate the state of the sensors. High-level alarm switch 80 and low-level/on-off switch 82 provide digital inputs to the selector stage. From the two switches there are four possible combinations. The four different states regarding the combination of the low-level/on-off switch and the high-level alarm, and their associated transmitted frequencies, may be illustrated as follows:

| State | Low-Level/ On-Off Switch | High-Level Alarm Switch | Frequency | Status/Action Taken |
|---|---|---|---|---|
| 1 | Closed | Closed | F/16 | Normal Off/Turn Pump Off |
| 2 | Open | Closed | F/8 | Normal On/Turn Pump On |
| 3 | Closed | Open | F/4 | Turn Pump On/ Turn Alarm On/ Malfunction (Redundant Run) |
| 4 | Open | Open | F/2 | Turn Pump On/Alarm On (Inflow is ahead of pump outflow) |

For example, with a level sensor constructed with two point level switches, e.g., low-level/on-off switch 82 and high-level alarm switch 80, and with both switches in the closed position, (i.e., state #1) the pump would be off. With an open contact in the low-level/on-off switch and a closed contact in the alarm switch (i.e., state #2) a normal run condition exists and would require the pump to turn on and purge the wastewater in the tank until the contact of the low-level/on-off switch closes. The open and closing of the low-level/on-off switch may be at different levels as noted on FIG. 1. For example, the low level pressure switch may change from a normally closed contact to a normally open contact at 8 inches of wastewater (state #1) and reset back to the normally closed position of 4 inches of wastewater (state #2). The various signals or frequencies of the oscillating programmable oscillator may be F/2=1,200 Hz, F/4=600 Hz, F/8=300 Hz, and F/16=150 Hz.

Properly conditioned by the input conditioner the switch states of the level sensor, as noted above, are used to provide a unique digital input code into the programmable oscillator and, thereby, select one of the stages of the counter chain. Since the electrical levels of the input code must be logical and, therefore, unambiguous, conditioning is necessary in order to nullify the stray capacitances which exist in the lead wires from the switches and which would, otherwise, generate ambiguous input signals.

From the present description, it will be appreciated that additional switches may be employed and used to provide digital inputs to the programmable oscillator, thereby resulting in additional output frequencies from the programmable oscillator.

With reference again to FIG. 9, the unique pulse train frequency appearing at the selected counter stage, and corresponding to a given state of the level sensor, gates a field modulator 350, typically a Field Effect Transistor (FET), which is essentially electrically placed across tuned tank 310. The effect of gating the field modulator is to cause it to short (e.g., ground out) and un-short the tuned tank, taking it out of, and into, resonance at the selected pulse train frequency. This action represents a changing load to the magnetic field which, because it is established by a compliant current in coil driver 120, forces the coil driver to inject more, or less, current into first coil 130 to support the load.

This changing or fluctuating current in coil 130 in transceiver/controller 100 is detected by modulation detector 124 which converts it to a digital pulse train that is read by microcontroller 140. In turn, after interpreting the pulse train frequency (e.g., comparing the detected frequency to a plurality of predetermined frequencies such as predetermined or programmable frequencies disposed in memory or a data storage unit), microcontroller 140 can suitably energize motor contactor solid state relay 150 to turn on the pump or energize the lamp/alarm solid state relay 160 to display an alarm or trouble condition.

In addition, conveying the sensor state by employing the technique of amplitude modulation has several benefits. Since each combination of the contact states of the point level switches corresponds to a unique frequency, a switch malfunction can be detected. For example, in the table above, since the low-level/on-off point is physically at a lower wastewater elevation than the high-level alarm switch, state #3 may occur, e.g., where the alarm switch is operating properly but the low-level/on-off switch has failed or if there is a leak in the air column. This condition can be annunciated by the microcontroller by its energizing the lamp/alarm solid state relay. In addition, in state #3, the pump may be turned on as well, i.e., a redundant run condition where the pump is cycled on and off as the wastewater cycles above and below the high-level position. In state #4, if inflow is ahead of pump outflow, the pump may be activated and send an alarm.

In addition, if a circuit fails in the transponder, or if there are errors, or if the gap between the coil in the transceiver/controller and the coil becomes too large, the reader chip in the transceiver/controller will detect a frequency that does not correspond to one of the four frequencies in the table above. Upon detection of a frequency not corresponding to one of the four frequencies, the microcontroller in the transceiver/controller may be able to identify a problem such as a circuit failure, or excessive physical separation between the coils of the transponder from the transceiver/controller. These conditions can also be annunciated by the microcontroller by its energizing the lamp/alarm solid state relay.

It is noted that due to the tolerances in manufacturing the circuits and maintaining the distance between the coils of the transceiver/controller and transponder, the detected frequency corresponding to a desired state may have tolerances as well, e.g., the detected frequency may be in a range of values. Tolerances for the detected frequencies for the different states may be kept low. However, it is noted that tolerances on the four frequencies noted above in the table may be just under +/−30% while still resulting in no overlap of a detected frequency of one state with a detected frequency of an adjacent state, i.e., still allowing differentiation between detected conditions for the various states.

Alternating the magnetic field at 125 kHz allows the transponder and transceiver/controller to communicate and properly function in the presence of water and other non-ferromagnetic media (this may not be true at higher frequencies where signal attenuation would become a factor). Additionally, AC motor frequencies and their harmonics (multiples of 50 and 60 Hz) are substantially far enough away from 125 kHz as to be ineffectual in causing communication interference.

In addition, the transceiver/controller may be operated continuously or periodically. The reader chip may also be operated in a sleep mode and periodically suitably energized for sampling.

Figure 10:
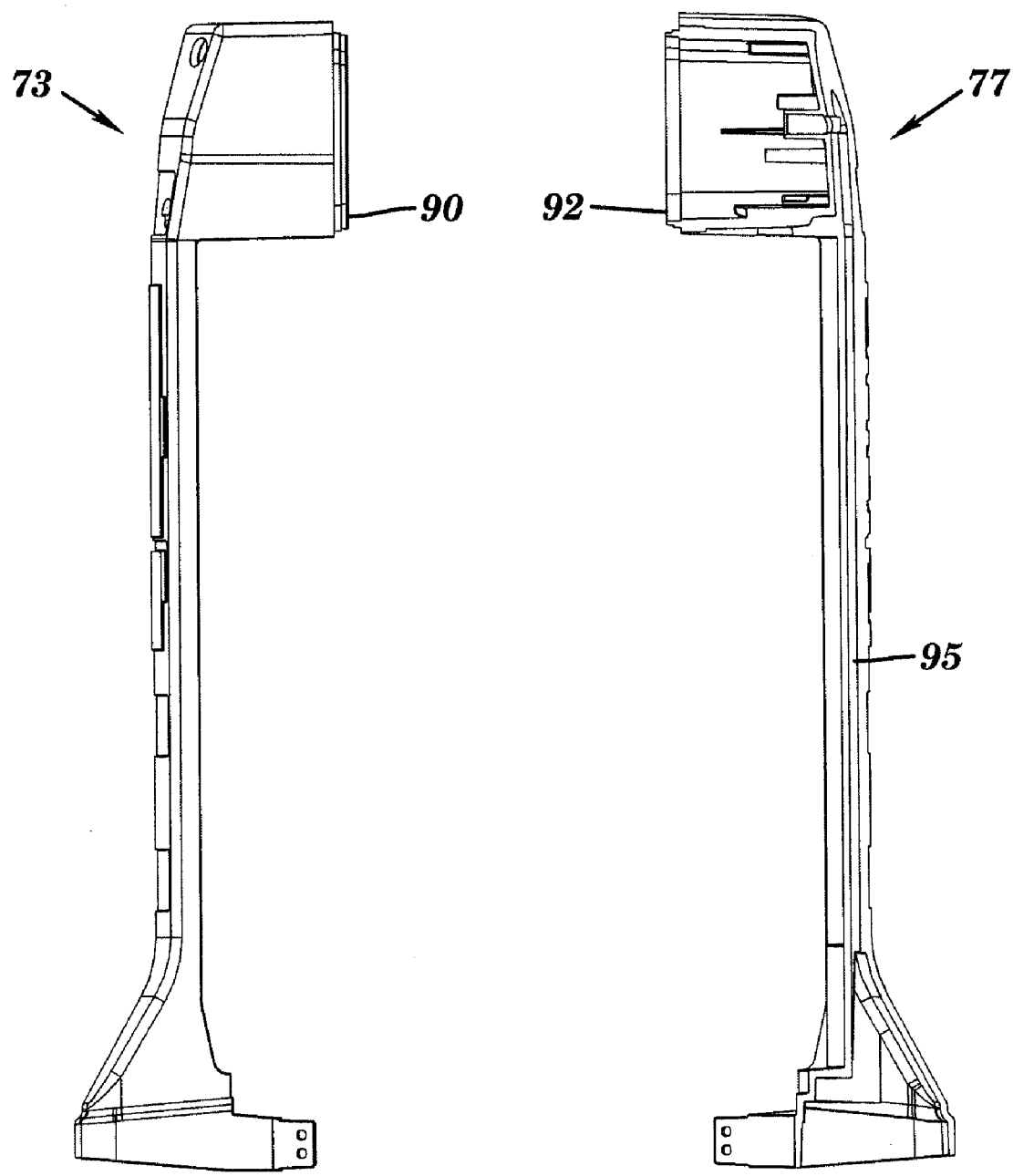
FIG. 10 is an exploded side elevational view of the two housing halves of the liquid level sensing assembly.

In another aspect of the present invention, with reference again to FIGS. 3 and 6, and to FIG. 10, liquid level sensing assembly 70 may have a two-piece configuration, e.g., comprises two housing halves 73 and 77 which are attached together with screws. Disposed within the two housing halves which form the central portion of liquid level sensing assembly 70 may be a generally rigid two-piece container formed from halves 90 and 92. Rigid halves 90 and 92 may be formed in a first mold or molds, for example from a generally rigid plastic material such as polypropylene.

The rigid halves may then be placed in a subsequent mold for forming an outer covering as well as the downwardly depending air columns, for example, from an injected thermoplastic elastomer. Using a gas assist process while the injected thermoplastic elastomer polymer is still heated, a suitable injection of gas may be supplied to bore a path through the enlarged vertical portion 79 (FIG. 3) of the air columns 74 forming a passageway 95 (FIG. 10) therethrough. The formed passageways are used as a gas channel in connection with the sensing of the level of the wastewater in the tank, i.e., transferring the air pressure in the air columns to sensors 80 and 82 (FIG. 6). A suitable gas assist process is disclosed in U.S. Pat. No. 5,948,445 entitled "Gas-Assisted Injection Mold", the entire subject matter of which is incorporated herein by reference.

Figure 11:
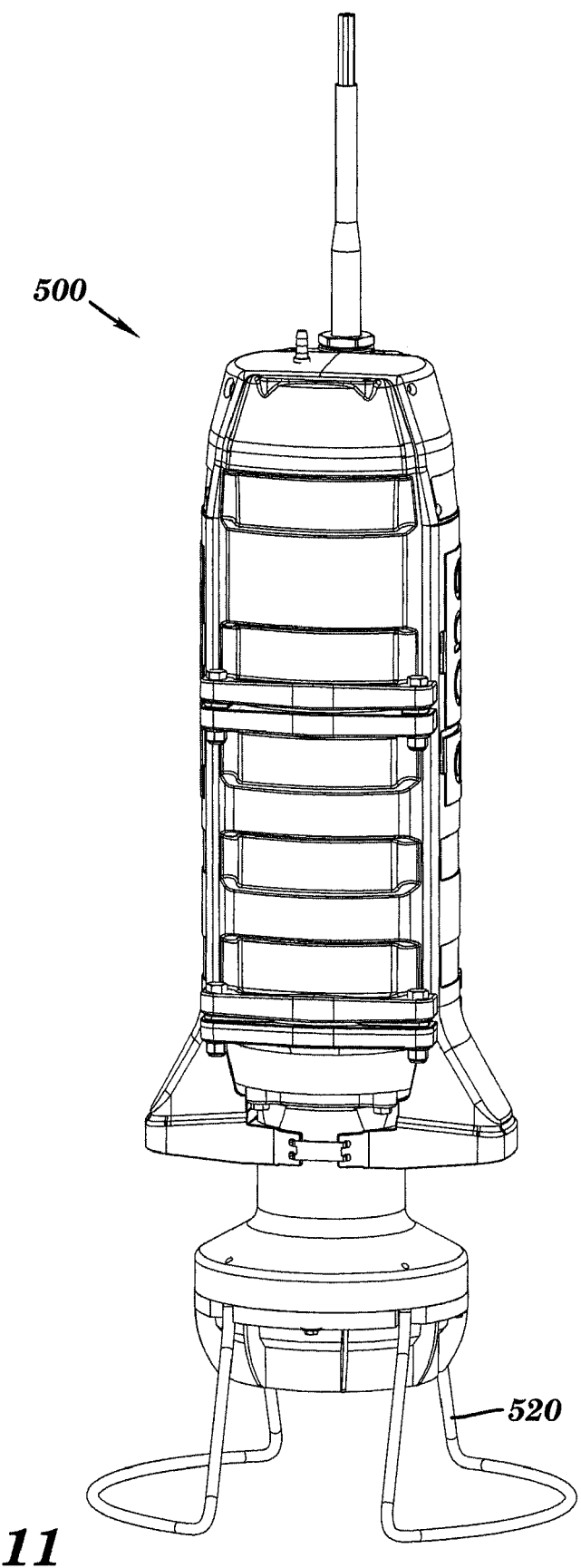
FIG. 11 is a perspective view of another embodiment of a grinder pump assembly in accordance with the present invention which includes a stand for supporting the grinder pump assembly from a bottom of a tank.

FIG. 11 illustrates another embodiment of a grinder pump assembly 500 in accordance with the present invention which includes a stand 520 for supporting the grinder pump assembly on a bottom of a tank. Such an assembly eliminates the need for a top housing. Such a grinder pump assembly 500 may incorporate the various features found in grinder pump assembly 30 such as the magnetic coupling and the other features.

From the present description, it will be appreciated by those skilled in the art that other tanks, grinder pumps, grinding mechanisms and pump assemblies may be suitably employed for treating wastewater and employed with the magnetic coupling of the liquid level sensor to the alarm/controller in accordance with the present invention. While the disclosed embodiments employ switches such as pressure switches, it will be appreciated that other switches and sensors such as pressure transducers may be employed as well as other sensors that provide an output corresponding to the level of the wastewater. Such outputs may be compared to a database of predetermined values or settings for controlling the grinder pump operation. For example, a pressure transducer may be employed for both the low-level and the high-level alarm. A pressure switch for a second high-level alarm may also be employed as a back up. Further, the grinder pump may also transmit alarm warnings to a remote location such as in a house or building or to a remote central monitoring facility.

While the use of the magnetic coupling has the benefit of reducing potential paths for leakage, from the present description it will also be appreciated by those skilled in the art that a low-cost version of the present invention may include the use of an inverted U-shaped liquid level sensor and/or the circuitry of the present invention in a grinder pump assembly wherein the liquid level sensor is hardwired, e.g., connected with electrical wires to the grinder pump.

Thus, while various embodiments of the present invention have been illustrated and described, it will be appreciated to those skilled in the art that many changes and modifications may be made thereunto without departing from the spirit and scope of the invention.

The invention claimed is:

1. A liquid level sensing assembly for wirelessly transmitting a plurality of signals based on a changing level of wastewater in a tank to a first coil of a transceiver/controller of a grinder pump, said liquid level sensing assembly comprising:
    at least one liquid level sensor operable in response to the changing level of the wastewater in the tank;
    a second coil positionable adjacent to the first coil of the transceiver/controller of the grinder pump;
    a transponder for extracting electrical energy using said second coil in response to the first coil, said transponder operably connected to said at least one liquid level sensor and operable to wirelessly transmit from said second coil to the first coil said plurality of signals based on the state of the at least one liquid level sensor due to the changing level of the wastewater in the tank; and
    wherein said transponder is operable to wirelessly transmit a first signal from said second coil to turn on the grinder pump, operable to wirelessly transmit a second signal from said second coil to turn off the grinder pump, and operable to wirelessly transmit a third signal from said second coil to indicate a third level of the wastewater for activation of an alarm.

2. The liquid level sensor of claim 1 wherein said at least one liquid level sensor comprises a plurality of liquid level sensors and wherein said plurality of signals are based on the combination of the state of the plurality of liquid level sensors.

3. The liquid level sensor assembly of claim 1 wherein said at least one liquid level sensor comprise a low-level/on-off sensor and a high-level sensor, and said transponder and said second coil are operable based on the states of the combination of the said low-level/on-off sensor and said high-level sensor.

4. The liquid level sensing assembly of claim 1 wherein said transponder is operable to wirelessly transmit a fourth signal from said second coil to indicate a malfunction.

5. The liquid level sensing assembly of claim 1 wherein said plurality of signals comprise a plurality of signals having different frequencies based on the level of the wastewater.

6. The liquid level sensing assembly of claim 1 wherein said plurality of signals comprise a plurality of signals having different frequencies in the range between about 100 Hz to about 2,000 Hz.

7. The liquid level sensing assembly of claim 1 further comprising at least one air column, and wherein said at least one liquid level sensor comprises a pressure sensor operably connected to said air column.

8. The liquid level sensing assembly of claim 1 further comprising a pair of air columns, and said at least one liquid level sensor comprises a first pressure sensor operably connected to one of said air columns and responsive to a low wastewater level and a second pressure sensor operably connected to said other of said air columns and responsive to a high-level alarm wastewater level.

9. The liquid level sensing assembly of claim 1 further comprising a generally inverted U-shaped housing for containing said transponder.

10. A grinder pump assembly comprising:
    said liquid level sensing assembly of claim 1; and
    the grinder pump comprising the first coil.

11. The grinder pump assembly of claim 10 wherein said liquid level sensing assembly comprises a generally inverted U-shaped housing positionable generally over said grinder pump.

12. The grinder pump assembly of claim 10 further comprising the tank.

13. The grinder pump assembly of claim 12 further comprising a top housing for supporting said grinder pump assembly in said tank.

14. The grinder pump assembly of claim 10 wherein said liquid level sensing assembly comprises a generally inverted U-shaped liquid level sensing assembly comprising a central portion having a sealed housing and first and second downwardly-depending air columns; and
    wherein said the liquid level sensing assembly is positionable generally over said grinder pump.

15. The grinder pump assembly of claim 14 wherein said grinder pump comprises an outer surface defining recessed channels along sides thereof for receiving a portion of said first and second downwardly-depending air columns.

16. The grinder pump assembly of claim 14 wherein first and second downwardly-depending air columns are formed by a gas assist process.

17. The grinder pump assembly of claim 14 further comprising the tank.

18. The grinder pump assembly of claim 17 further comprising a top housing for supporting said grinder pump assembly in said tank.

19. A liquid level sensing assembly for wirelessly transmitting a plurality of signals based on a changing level of wastewater in a tank to a control unit having a first coil disposed in a grinder pump, said liquid level sensing assembly comprising:
    a sealed housing;
    a first and a second air columns, upper ends of which being operably connected to said sealed housing and lower ends of which being positionable in the wastewater;
    a first pressure sensor operably connected to said sealed housing and responsive to pressure in said first air column for detecting to a low wastewater level;
    a second pressure sensor operably connected to said sealed housing and responsive to pressure in said second air column for detecting an alarm high wastewater level;
    a second coil positionable adjacent to the first coil of the transceiver/controller of the grinder pump; and
    a transponder disposed in said sealed housing for extracting electrical energy from said second coil in response to the first coil, said transponder operably connected to said first and second pressure sensors and operable to wirelessly transmit from the second coil to the first coil said plurality of signals based on a combination of the states of the first pressure sensor and the second pressure sensor due to the changing level of the wastewater in the tank.

20. The liquid level sensing assembly of claim 19 wherein said transponder is operable to wirelessly transmit a first signal from said second coil to turn on the grinder pump, operable to wirelessly transmit a second signal from said second coil to turn off the grinder pump, and operable to wirelessly transmit a third signal from said second coil activate an alarm.

21. The liquid level sensing assembly of claim 20 wherein said transponder is operable to wirelessly transmit a fourth signal from said second coil to indicate a malfunction.

22. The liquid level sensing assembly of claim 19 wherein said plurality of signals comprise a plurality of different frequencies based on the level of the wastewater.

23. The liquid level sensing assembly of claim 19 wherein said plurality of signals comprise a plurality of different frequencies in the range between about 100 Hz to about 2,000 Hz.

24. A grinder pump assembly comprising:
said liquid level assembly of claim 19; and
the grinder pump comprising the first coil.

25. The grinder pump assembly of claim 24 wherein said liquid level sensing assembly comprises a generally U-shaped housing receivable in recessed channels in a surface of a housing of said grinder pump.

26. The grinder pump assembly of claim 24 further comprising the tank.

27. The grinder pump assembly of claim 26 further comprising a top housing for supporting said grinder pump assembly in said tank.

28. The grinder pump assembly of claim 24 wherein said liquid level sensing assembly comprises a generally inverted U-shaped liquid level sensing assembly comprising a central portion comprising said sealed housing and said first and second downwardly-depending air columns; and
wherein said the liquid level sensing assembly is positionable generally over said grinder pump.

29. The grinder pump assembly of claim 28 wherein said grinder pump comprises an outer surface defining recessed channels along sides thereof for receiving a portion of said first and second downwardly-depending air columns.

30. The grinder pump assembly of claim 28 wherein first and second downwardly-depending air columns are formed by a gas assist process.

31. The grinder pump assembly of claim 28 further comprising the tank.

32. The grinder pump assembly of claim 31 further comprising a top housing for supporting said grinder pump assembly in said tank.

33. A grinder pump assembly comprising:
a grinder pump comprising a first coil and a transceiver/controller; and
a liquid level sensing assembly for wirelessly transmitting a plurality of signals based on a changing level of wastewater in a tank to said first coil of said transceiver/controller of said grinder pump, said liquid level sensing assembly comprising:
at least one liquid level sensor operable in response to the changing level of the wastewater in the tank;
a second coil positionable adjacent to said first coil of said transceiver/controller of said grinder pump; and
a transponder for extracting electrical energy using said second coil in response to said first coil, said transponder operably connected to said at least one liquid level sensor and operable to wirelessly transmit from said second coil to said first coil said plurality of signals based on the state of said at least one liquid level sensor due to the changing level of the wastewater in the tank.

34. The liquid level sensor of claim 33 wherein said at least one liquid level sensor comprises a plurality of liquid level sensors and wherein said plurality of signals are based on the combination of the state of the plurality of liquid level sensors.

35. The liquid level sensor assembly of claim 33 wherein said at least one liquid level sensor comprise a low-level/on-off sensor and a high-level sensor, and said transponder and said second coil are operable based on the states of the combination of the said low-level/on-off sensor and said high-level sensor.

36. The liquid level sensing assembly of claim 33 wherein said transponder is operable to wirelessly transmit a first signal from said second coil to turn on the grinder pump, operable to wirelessly transmit a second signal from said second coil to turn off the grinder pump, and operable to wirelessly transmit a third signal from said second coil to indicate a third level of the wastewater for activation of an alarm.

37. The liquid level sensing assembly of claim 36 wherein said transponder is operable to wirelessly transmit a fourth signal from said second coil to indicate a malfunction.

38. The liquid level sensing assembly of claim 33 wherein said plurality of signals comprise a plurality of signals having different frequencies based on the level of the wastewater.

39. The liquid level sensing assembly of claim 33 wherein said plurality of signals comprise a plurality of signals having different frequencies in the range between about 100 Hz to about 2,000 Hz.

40. The liquid level sensing assembly of claim 33 further comprising at least one air column, and wherein said at least one liquid level sensor comprises a pressure sensor operably connected to said air column.

41. The liquid level sensing assembly of claim 33 further comprising a pair of air columns, and said at least one liquid level sensor comprises a first pressure sensor operably connected to one of said air columns and responsive to a low wastewater level and a second pressure sensor operably connected to said other of said air columns and responsive to a high-level alarm wastewater level.

42. The liquid level sensing assembly of claim 33 further comprising a generally inverted U-shaped housing for containing said transponder.

43. A liquid level sensing assembly for wirelessly transmitting a plurality of signals based on a changing level of wastewater in a tank to a first coil of a transceiver/controller of a grinder pump, said liquid level sensing assembly comprising:
at least one liquid level sensor operable in response to the changing level of the wastewater in the tank;
a second coil positionable adjacent to the first coil of the transceiver/controller of the grinder pump; and
a transponder for extracting electrical energy using said second coil in response to the first coil, said transponder operably connected to said at least one liquid level sensor and operable to wirelessly transmit from said second coil to the first coil said plurality of signals based on the state of the at least one liquid level sensor due to the changing level of the wastewater in the tank; and
wherein said at least one liquid level sensor comprises a low-level/on-off sensor and a high-level sensor, and said transponder and said second coil are operable based on the states of the combination of the said low-level/on-off sensor and said high-level sensor.

44. A liquid level sensing assembly for wirelessly transmitting a plurality of signals based on a changing level of wastewater in a tank to a first coil of a transceiver/controller of a grinder pump, said liquid level sensing assembly comprising:

at least one liquid level sensor operable in response to the changing level of the wastewater in the tank;
a second coil positionable adjacent to the first coil of the transceiver/controller of the grinder pump; and
a transponder for extracting electrical energy using said second coil in response to the first coil, said transponder operably connected to said at least one liquid level sensor and operable to wirelessly transmit from said second coil to the first coil said plurality of signals based on the state of the at least one liquid level sensor due to the changing level of the wastewater in the tank; and
a generally inverted U-shaped housing for containing said transponder.

* * * * *